United States Patent [19]
Blue

[11] 4,153,279
[45] May 8, 1979

[54] MOUNTING ASSEMBLY FOR A BRAKELINE TEE

[76] Inventor: William C. Blue, 16940 Edinburg Dr., South Bend, Ind. 46635

[21] Appl. No.: 754,349

[22] Filed: Dec. 27, 1976

[51] Int. Cl.² .......................... B60D 1/08; F16L 3/00
[52] U.S. Cl. ..................................... 285/62; 248/231; 285/156
[58] Field of Search ............... 285/62, 63, 209, 156 N; 248/65, 67, 67.5, 231; 137/351

[56] References Cited

U.S. PATENT DOCUMENTS

| | | | |
|---|---|---|---|
| 1,156,463 | 10/1915 | Campbell | 248/67 |
| 1,211,039 | 1/1917 | Ayers | 248/67 |
| 1,470,485 | 10/1923 | DeRouen | 285/156 X |
| 1,601,612 | 9/1926 | Edwards | 248/231 X |
| 1,803,577 | 5/1931 | Weatherhead | 285/156 X |
| 1,808,516 | 6/1931 | Bartsch | 248/67 |
| 2,062,449 | 12/1936 | Dick | 285/62 |
| 2,447,833 | 8/1948 | Auer | 248/231 X |
| 3,232,568 | 2/1966 | Lennon et al. | 248/67 |
| 3,302,912 | 2/1967 | Hurlburt | 248/65 |

FOREIGN PATENT DOCUMENTS 637657 5/1950 United Kingdom .................. 248/67.5

Primary Examiner—Rodney H. Bonck
Attorney, Agent, or Firm—Harry G. Thibault

[57] ABSTRACT

A mounting assembly is provided for the tee fitting for a brakeline assembly. In a preferred embodiment of the present invention, a rectangular housing has open faces provided on side walls of the housing to permit access to the fitting enclosed therein. A step portion provided on the mounting assembly between the fitting and the housing permits a strap to be inserted into a groove between the housing and the fitting to fasten the combination to an axle of a vehicle. Other embodiments of the present invention include a housing adapted to accommodate a strap to be secured to the axle of the vehicle.

3 Claims, 7 Drawing Figures

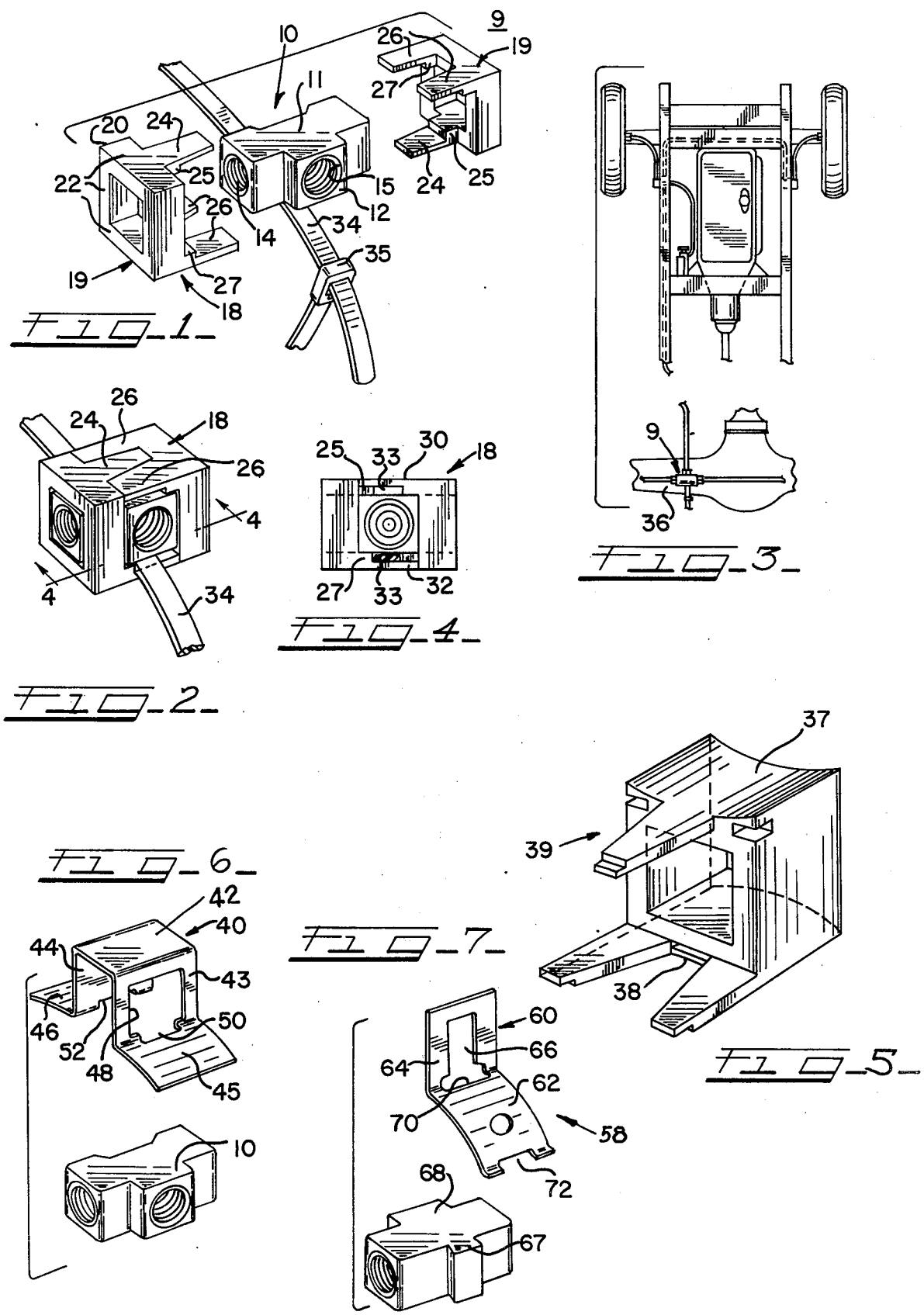

MOUNTING ASSEMBLY FOR A BRAKELINE TEE

FIELD OF THE INVENTION

This invention pertains to a mounting assembly for securing a tee fitting for a brakeline assembly to the axle of a vehicle.

DESCRIPTION OF THE PRIOR ART

Typically, a brakeline fitting has been oversized or provided with additional flanges which enable the fitting to be fastened to the axle or frame of the vehicle by means of a threaded opening provided both in the frame and in the fitting with a fastener passed through the aligned openings, or the flanges of the fitting are secured to the frame by means of special clips associated therewith. Such a fitting requires extra metal in the manufacture or additional machining processes in the manufacture or preparation of special assemblies to mount the fitting to the frame or axle.

It would be desirable to eliminate the use of excess metal in the fitting by eliminating the flanges or additional projections provided on the fitting. Further, it would be advantageous to eliminate machining processes associated with securing the fitting to the axle. Accordingly, it is an object of the present invention to provide a simple low-cost fitting which substantially encloses a brakeline tee, the assembly thus provided being easily secured to the axle of the vehicle.

SUMMARY OF THE INVENTION

The present invention provides a mounting assembly comprising a brakeline fitting and a housing enclosing the fitting, the assembly mountable on the axle or frame of a vehicle. In a preferred embodiment of the present invention the housing portion of the assembly provides open faces on opposite end walls and on a pair of opposite side walls thereof. The housing may be made of two corresponding parts to be welded about a brakeline tee fitting or the housing may be extruded around the fitting by a suitable molding process. Provided interior of the housing adjacent the top and bottom walls of the tee fitting is a step portion of the housing, the step portion defining a groove in the assembly between the housing and the tee fitting, the groove capable of receiving a strap suitable for securing the assembly to the axle of a vehicle.

In a second embodiment of the invention one face of the housing may be curved to conform to the curved surface of the axle of a vehicle.

In a third embodiment of the invention the housing may comprise a U-shaped member having flange portions at the ends of the legs of the U-shaped member, the flanged end portions being curved to conform to the surface of the axle, the U-shaped member receiving the brakeline tee fitting, the leg portions of the member having respective openings therein to accommodate a strap for securing the assembly to the axle of a vehicle.

The fourth embodiment of the present invention incorporates a generally L-shaped strap having a base leg portion curved to conform to the surface of the axle of the vehicle and an upright leg portion receiving the fitting, the strap having opposite cut-out portions to accommodate a longitudinal strap for securing the assembly to the vehicle, the upright leg portion of the fitting having a slot therein for receiving a modified version of the tee fitting for a brakeline assembly.

A method of forming the assembly comprising the preferred embodiment of the invention may be described as follows. The housing comprises a pair of identically shaped members, each having a body portion and opposite side portions protruding longitudinally from a hollow base. Each plastic member comprises a base portion, a pair of spaced longitudinal members on one side of the base and a longitudinal member on the opposite side of the base intermediate of the spacing of the opposite side members. Each of the side members has a step provided therein adjacent the base of the member. A suitable brake fitting is inserted in one member of the housing, with a second member of the housing being slipped over the fitting to cooperatively join with the first member in a male-female configuration. The assembled housing provides a pair of closed side walls and a pair of open side walls exposing suitable orifices provided in the fitting. The step portions in the side members provide grooves in the respective top and bottom walls, one of the grooves receiving a locking strap which is inserted between the fitting and the housing, the flexible strap then being wrapped around the axle and locked in place.

The present invention provides a simple and economical means of securing a brake fitting to the axle of a vehicle. These and other advantages of the present invention will become apparent upon a reading of the following specification and an inspection of the accompanying drawings.

DESCRIPTION OF THE DRAWINGS

FIG. 1 is an exploded perspective view of the preferred embodiment of the assembly of the present invention;

FIG. 2 is a perspective view of the completed assembly of the present invention;

FIG. 3 is a schematic showing the mounting of the assembly of the present invention on the axle of a vehicle;

FIG. 4 is an end view of the preferred embodiment of the present invention;

FIG. 5 is a second embodiment of the present invention;

FIG. 6 is a third embodiment of the present invention; and

FIG. 7 is a fourth embodiment of the present invention.

DETAILED DESCRIPTION OF THE PREFERRED EMBODIMENT

A mounting assembly 9 of the present invention comprises a brakeline tee fitting 10 having a base portion 11 and an extended portion 12. Provided at opposite ends of the base portion 11 are threaded openings 14 which terminate at an internal tee-shaped passage (not shown) adapted to receive a flare fitting for a brake line. The extended portion 12 also has a threaded opening 15 which extends into the internal passage.

A housing 18 for the tee fitting 10 comprises identical portions 19 symmetrically joined to form the housing 18. Each portion 19 comprises a base 20 having mutually connected sidewalls 22. Extending outwardly from the first of a pair of opposite sidewalls 22 at a mid portion thereof is a projection 24 having a step 25 at the base thereof. Extending outwardly from the second of the pair of opposite sidewalls 22 are a pair of parallel projections 26 at opposite ends thereof, each projection 26 having a step 27 at the base thereof and generally bracketing the projection 24 provided on the first opposite side wall 22.

The pair of members 19 are symmetrically joined to form the housing 18. That is, a pair of symmetric members 19 are reversely positioned so that the projection 24 of one sidewall 22 of one member 19 cooperatively interposes the space between the projections 26 of a reversely positioned member 19, the members 26 of the reversely positioned member 19 cooperatively engaging the projection 24 of the first member 19. The assembled housing 18 has closed faces 30 and 32 on which members 24 and 26 of opposing portions 19 are cooperatively joined. Openings are provided in the remaining two faces and in the bases 20 of the assembled housing 18 into which the end portions of the base 11 of the brakeline tee 10 extend for access thereto for the couplings of the brakeline system. The steps 25,27 provided in the projections 24,26 of the members 19 combine therewith in the assembled housing to provide grooves 33 between the brakeline fitting 10 and the housing 18 of the assembly 9. A self-locking serrated strap 34 having a locking member 35 provided at one end thereof may be inserted in the groove between the fitting 10 and the housing 18 and wrapped around an axle 36 to lock the assembly 9 thereto.

In the preferred embodiment of the invention the housing 18 is formed by identical members 19 which are fitted around the brakeline fitting 10 and suitably joined as by welding to complete the mounting assembly. Of course, the housing could be of a similar configuration and extruded about the brakeline fitting by an extrusion process. In the preferred embodiment, the housing is made from a plastic material to simplify the machining processes and to accommodate the extrusion process. The housing 18 can of course also be made of metal.

ADDITIONAL EMBODIMENTS OF THE PRESENT INVENTION

FIG. 5 shows an additional embodiment of the present invention wherein upper and lower faces 37 and 38 of the brakeline housing 39 may be curved to conform to the curved surface of the axle 36 on which the housing 18 is mounted.

In FIG. 6 a third embodiment of the brakeline housing is shown. The housing 40 shown in FIG. 6 comprises a U-shaped member having a base portion 42 and side walls 43 and 44, the side walls 43 and 44 terminating in outwardly extending flanges 45 and 46 respectively. The flanges 45 and 45 are complementarily formed to conform to the curved surface of an axle housing. The side wall 43 of the housing 40 has an opening 48 therein for receiving the extending portion 12 of the brakeline tee fitting 10. Provided at the lower end of the opening 48 is a slot 50 at the juncture of the sidewall 43 and the flange 45. An opposite slot 52 is provided at the juncture of the side wall 44 and the flange 46. The slots 50 and 52 provided in the housing 42 accommodate a flexible strap 34 having a locking member 35 associated therewith for securing the housing 40 and its associated fitting 10 to the axle of the vehicle.

A fourth embodiment to the present invention is shown in FIG. 7. A mounting assembly 58 comprises a housing 60 generally of L-shaped configuration having a base portion 62 and a leg portion 64. The base portion 62 is curved to conform to the surface of the axle to which the housing 60 is to be fastened. The leg portion 64 has an opening 66 therein for receiving a complementary projection 67 provided on the rear wall of a brakeline tee fitting 68. The opening 66 has a slot 70 at a lower end of the opening 66 provided at the juncture of the base 62 and the leg 64 of the housing 60. The opposite end of the base 62 has a slot 72 therein aligned with the slot 70. The slots 70 and 72 receive a strap 34 suitable for securing the assembly 58 to the axle of the vehicle.

Having thus described a preferred embodiment of the present invention and a number of secondary embodiments thereof, it is apparent that the present invention provides a means of securing a brakeline fitting to the axle of a vehicle without substantially increasing the size of the basic fitting or requiring special machines or techniques for securing the fitting to the axle. It should be apparent to those skilled in the art that other modifications may be made in certain of the structure illustrated in that equivalent elements may be substituted for those that have been disclosed. It is, therefore, intended that all such modifications and substitutions be covered as they are embraced within the scope of the appended claims.

I claim:

1. A mounting assembly comprising a housing and a multiple outlet fitting having opposite ends, the fitting received in the housing and the assembly mountable on an axle of a vehicle, the housing comprising a pair of complementary members each having a base portion having an opening therein, each base portion having complementary side portions coextensive with each base portion on opposite sides thereof, the complementary side portions of each member cooperatively engaging to form a pair of opposite side walls of the assembled housing when the members are joined, the base portion of respective members providing opposite end portions of the housing and each having said opening therein to receive respective end portions of the fitting, the pair of opposite side walls connecting the end portions of the housing and providing opposite open faces adjacent opposite side walls thereof, respective step portions provided in the side portions of each complementary member to provide step portions in the side walls of the assembled housing adjacent opposite end portions thereof, a protruding side portion of the fitting received in one of the open faces of the housing to provide access thereto, the fitting overlying each step portion of the housing to form a groove between the fitting and the housing at each side wall, and a fastening means receivable in one of the grooves provided to secure the mounting assembly to the axle of a vehicle.

2. The mounting assembly as claimed in claim 1 wherein the fastening means comprises a flexible strap insertable into one of the grooves between the fitting and the housing, the strap being wrapped around the axle of the vehicle to secure the assembly thereto.

3. The mounting assembly as claimed in claim 2 wherein opposite connecting walls of the housing are curved to conform to the surface of the axle to which the fitting is mounted.

* * * * *